(12) United States Patent
Sakimura et al.

(10) Patent No.: US 9,310,487 B2
(45) Date of Patent: Apr. 12, 2016

(54) LIDAR WITH A PLURALITY OF LASER LIGHT RAYS HAVING DIFFERENT WAVELENGTHS

(71) Applicants: Takeshi Sakimura, Tokyo (JP); Takayuki Yanagisawa, Tokyo (JP); Shumpei Kameyama, Tokyo (JP); Toshiyuki Ando, Tokyo (JP); Yoshihito Hirano, Tokyo (JP)

(72) Inventors: Takeshi Sakimura, Tokyo (JP); Takayuki Yanagisawa, Tokyo (JP); Shumpei Kameyama, Tokyo (JP); Toshiyuki Ando, Tokyo (JP); Yoshihito Hirano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 41 days.

(21) Appl. No.: 14/347,938

(22) PCT Filed: Dec. 7, 2012

(86) PCT No.: PCT/JP2012/081808
§ 371 (c)(1),
(2) Date: Mar. 27, 2014

(87) PCT Pub. No.: WO2013/094431
PCT Pub. Date: Jun. 27, 2013

(65) Prior Publication Data
US 2014/0233013 A1  Aug. 21, 2014

(30) Foreign Application Priority Data
Dec. 21, 2011 (JP) ................. 2011-280067

(51) Int. Cl.
*G01C 3/08* (2006.01)
*G01S 17/10* (2006.01)
(Continued)

(52) U.S. Cl.
CPC ............. *G01S 17/102* (2013.01); *G01S 7/484* (2013.01); *G01S 7/4815* (2013.01); *G01S 7/4818* (2013.01); *G01S 17/107* (2013.01); *G01S 17/58* (2013.01); *G01S 17/95* (2013.01)

(58) Field of Classification Search
CPC ... G01S 17/102; G01S 7/4815; G01S 7/4818; G01S 7/484; G01S 17/107
See application file for complete search history.

(56) References Cited

U.S. PATENT DOCUMENTS 5,381,262 A    1/1995  Arima et al.
2002/0145794 A1 * 10/2002  Pedersen ..................... 359/337
(Continued)

FOREIGN PATENT DOCUMENTS

JP    06-069570 A    3/1994
JP    2003-307567    10/2003
(Continued)

OTHER PUBLICATIONS

G. N. Pearson, et al., "A 1.5μm coherent pulsed Doppler lidar using fibre-optics components", Proceedings of 11th Coherent Laser Radar Conference, pp. 144-146 (Jul. 2001).

(Continued)

*Primary Examiner* — Samantha K Abraham
(74) *Attorney, Agent, or Firm* — Oblon, McClelland, Maier & Neustadt, L.L.P.

(57) ABSTRACT

A lidar includes CW laser light sources that oscillate CW laser light rays with wavelengths different from each other; an optical multiplexing coupler that mixes the CW laser light rays oscillated by the CW laser light sources; an optical branching coupler that splits the CW laser light passing through the mixing by the optical multiplexing coupler; a light modulator that modulates first CW laser light split by the optical branching coupler; and an optical fiber amplifier that amplifies the laser light modulated by the light modulator, in which a transmit-receive optical system irradiates a target with the laser light amplified by the optical fiber amplifier, and receives scattered light of the laser light by the target.

10 Claims, 6 Drawing Sheets

(51) Int. Cl.
  *G01S 17/95* (2006.01)
  *G01S 17/58* (2006.01)
  *G01S 7/481* (2006.01)
  *G01S 7/484* (2006.01)

(56) References Cited

U.S. PATENT DOCUMENTS

| | | | |
|---|---|---|---|
| 2003/0161375 A1* | 8/2003 | Filgas et al. | 372/66 |
| 2004/0027582 A1* | 2/2004 | Dulman | 356/511 |
| 2006/0071846 A1 | 4/2006 | Yanagisawa et al. | |
| 2006/0222372 A1* | 10/2006 | Spinelli et al. | 398/183 |
| 2007/0215795 A1* | 9/2007 | Kameyama et al. | 250/222.2 |
| 2011/0049337 A1* | 3/2011 | Taira et al. | 250/216 |

FOREIGN PATENT DOCUMENTS

| | | |
|---|---|---|
| JP | 2004-219207 A | 8/2004 |
| JP | 2007-315758 A | 12/2007 |
| WO | 2004/106971 A1 | 12/2004 |

OTHER PUBLICATIONS

International Search Report issued Feb. 26, 2013 in PCT/JP12/081808 filed Dec. 7, 2012.

Extended Search Report issued Sep. 7, 2015 in European Patent Application No. 12860735.5.

Kevin D. Ridley, et al., "Improved speckle statistics in coherent differential absorption lidar with in-fiber wavelength multiplexing", Applied Optics, XP-002260851, vol. 40, No. 12, Apr. 2001, 8 pages.

* cited by examiner ved light power because of an increase of the loss of the received light, thereby reducing the SN ratio of the coherent detection signal for the individual wavelengths.

LIDAR WITH A PLURALITY OF LASER LIGHT RAYS HAVING DIFFERENT WAVELENGTHS

TECHNICAL FIELD

The present invention relates to a lidar for measuring the position or velocity of a target by using an optical fiber as a propagation path of light within the lidar, by emitting laser light into an atmosphere, by receiving scattered light of the laser light by a target (such as the atmosphere, particles and aerosol in the atmosphere, a flying object and a building), and by detecting the Doppler shift the scattered light undergoes.

BACKGROUND ART

The following Non-Patent Document 1 discloses a lidar that generates pulses of transmission light by using as a light modulator an acoustooptic (AO) device driven by a pulse.

In addition, the following Patent Document 1 discloses a lidar that uses an optical fiber as a propagation path of light within the lidar. Considering that the peak power of the transmission light is limited owing to nonlinear optical effect called stimulated Brillouin scattering that occurs within the optical fiber, the lidar implements high SN ratio measurement by increasing transmission power by using a plurality of CW laser light sources with different wavelengths.

Incidentally, the lidar achieves the high SN ratio by carrying out signal separation processing that separates the received light for the individual wavelengths with a wavelength separation device, by performing coherent detection processing by combining the received light for the individual wavelengths and local oscillation light for the individual wavelengths, and by carrying out integral processing of the individual coherent detection signals.

PRIOR ART DOCUMENT

Patent Document

Patent Document 1: Japanese Patent Laid-Open No. 2004-219207 (Paragraph No. [0011], and FIG. 1)

Non-Patent Document

Non-Patent Document 1: G. N. Pearson and J. Eacock, "Proceedings of 11th Coherent Laser Radar Conference" (Malvern, Worcestershire, UK, July 2001), pp. 144-146.

DISCLOSURE OF THE INVENTION

Problems To Be Solved by the Invention

With the foregoing configuration, although the conventional lidar can implement the high SN ratio measurement, since it requires photodetectors for the individual wavelengths of the signal light, it has a problem of complicating the configuration and increasing its size, resulting in an increase of its cost.

In addition, as the number of the signal light wavelengths increases, the wavelength separation device must separate an increasing number of wavelengths, which offers a problem of complicating the structure, attenuates the received light power because of an increase of the loss of the received light, thereby reducing the SN ratio of the coherent detection signal for the individual wavelengths.

The present invention is implemented to solve the foregoing problems. Therefore it is an object of the present invention to provide a lidar capable of implementing the high SN ratio measurement with a simple configuration without complicating the configuration.

Means for Solving the Problems

A lidar in accordance with the present invention comprises: a CW laser light source that oscillates a plurality of CW laser light rays with different wavelengths; an optical branching unit that splits the CW laser light oscillated by the CW laser light source; a light modulator that modulates first CW laser light split by the optical branching unit; an optical fiber amplifier that amplifies the laser light modulated by the light modulator; a transmit-receive optical system that irradiates a target with the laser light amplified by the optical fiber amplifier, and that receives scattered light of the laser light by the target; an optical multiplexer that mixes the scattered light received by the transmit-receive optical system and second CW laser light split by the optical branching unit, and that outputs mixed light of the scattered light and the CW laser light; a photodetector that receives the mixed light output from the optical multiplexer, and that detects beat signals of the scattered light and the CW laser light; and an information extractor that extracts information about the target from the beat signals detected with the photodetector, wherein propagation optical paths of light within the lidar are composed of an optical fiber, and the beat signals detected by the photodetector are superposition of spectral components of the beat signals derived from the plurality of CW laser light rays with different wavelengths.

Advantages of the Invention

According to the present invention, it is configured in such a manner as to comprise a CW laser light source that oscillates a plurality of CW laser light rays with different wavelengths, an optical branching unit that splits the CW laser light oscillated by the CW laser light source, a light modulator that modulates first CW laser light split by the optical branching unit, and an optical fiber amplifier that amplifies the laser light modulated by the light modulator, in which the transmit-receive optical system irradiates the target with the laser light amplified by the optical fiber amplifier, and receives the scattered light of the laser light by the target. Accordingly, it has an advantage of being able to implement the high SN ratio measurement with a simple configuration without complicating the configuration.

BEST MODE FOR CARRYING OUT THE INVENTION

The best mode for carrying out the invention will now be described with reference to the accompanying drawings to explain the present invention in more detail.

Embodiment 1

Figure 1:
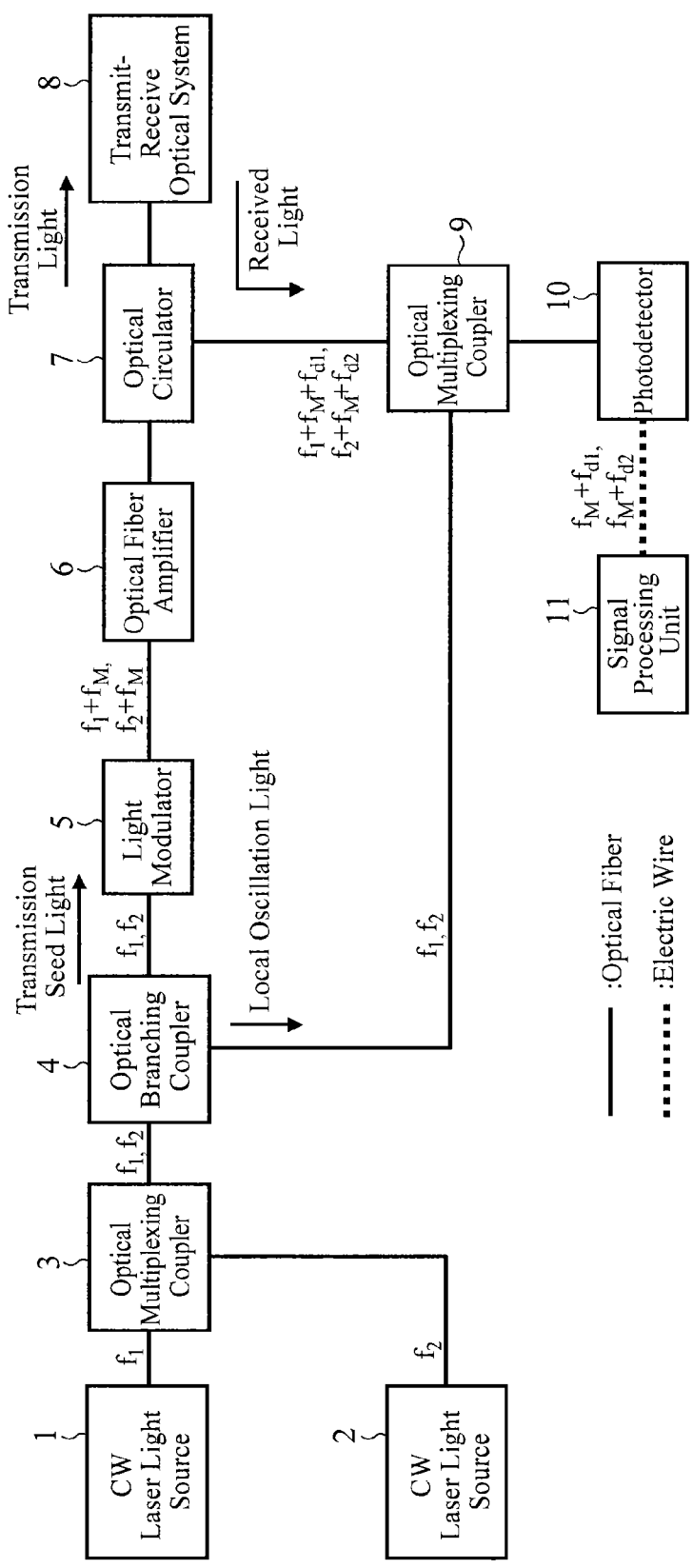
FIG. 1 is a block diagram showing a configuration of a lidar of an embodiment 1 in accordance with the present invention.

FIG. 1 is a block diagram showing a configuration of a lidar of an embodiment 1 in accordance with the present invention.

In FIG. 1, a CW laser light source 1 is a light source that oscillates CW (Continuous Wave) laser light with frequency $f_1$.

A CW laser light source 2 is a light source that oscillates CW laser light with frequency $f_2$.

It is assumed here that the frequencies $f_1$ and $f_2$ of the CW laser light rays oscillated by the CW laser light sources 1 and 2 are within the gain band of an optical fiber amplifier 6, and that the difference between the frequency $f_1$ and the frequency $f_2$ is greater than the gain bandwidth of stimulated Brillouin scattering occurring in an optical fiber.

An optical multiplexing coupler 3 is an optical element that mixes the CW laser light with frequency $f_1$ oscillated by the CW laser light source 1 and the CW laser light with frequency $f_2$ oscillated by the CW laser light source 2. Incidentally, the optical multiplexing coupler 3 constitutes a first optical multiplexer.

An optical branching coupler 4 is an optical element that branches the CW laser light mixed through the optical multiplexing coupler 3 into two parts, and supplies first CW laser light to the light modulator 5 as transmission seed light and second CW laser light to the optical multiplexing coupler 9 as local oscillation light. Incidentally, the optical branching coupler 4 constitutes an optical branching unit.

The light modulator 5 generates the pulses from the transmission seed light output from the optical branching coupler 4 and adds the modulation of the frequency (adds a medium frequency $f_M$ used at the time of coherent detection), thereby executing the processing of supplying the optical fiber amplifier 6 with the transmission seed light with frequencies $f_1+f_M$ and $f_2+f_M$ after the modulation.

The optical fiber amplifier 6 is an optical element that amplifies the laser light which is the transmission seed light after the modulation output from the light modulator 5.

An optical circulator 7 is an optical element that passes the laser light amplified by the optical fiber amplifier 6 to the transmit-receive optical system 8, and that switches the optical path of laser light (scattered light received by the transmit-receive optical system 8), which propagates in the direction opposite to the foregoing laser light to an optical multiplexing coupler 9 so as to cause the laser light to propagate through the optical multiplexing coupler 9.

The transmit-receive optical system 8 irradiates a target (such as the atmosphere, particles or aerosol in the atmosphere, a flying object, and a building) with the laser light that has passed through the optical circulator 7, and performs the processing of receiving the scattered light of the laser light by the target.

The optical multiplexing coupler 9 is an optical element that mixes the scattered light, which is received by the transmit-receive optical system 8 and passes through the optical circulator 7, with the local oscillation light output from the optical branching coupler 4, and outputs the mixed light of the scattered light and the local oscillation light. Incidentally, the optical multiplexing coupler 9 constitutes a second optical multiplexer.

A photodetector 10 receives the mixed light output from the optical multiplexing coupler 9, and performs the processing of detecting a beat signal of the scattered light and the local oscillation light.

A signal processing unit 11, which is an information extractor, extracts information about the target (information such as the received signal strength, round-trip time, and Doppler frequency of the scattered light) from the beat signal detected with the photodetector 10, and performs the processing of calculating motion specifications of the target (such as the distance to the target and velocity distribution) from the information about the target.

Incidentally, in the lidar of FIG. 1, although the photodetector 10 and the signal processing unit 11 are connected through an electric wire, the remaining components are connected through an optical fiber.

Next, the operation will be described.

It is assumed in the present embodiment 1 that the target is aerosol (particles such as dust suspended in the atmosphere), and an example will be described of measuring the wind speed by detecting the Doppler shift of the scattered light of the laser light due to the aerosol.

First, the CW laser light source 1 oscillates the CW laser light with frequency $f_1$. The CW laser light is fed to the optical fiber and propagates to the optical multiplexing coupler 3.

In addition, the CW laser light source 2 oscillates the CW laser light with frequency $f_2$. The CW laser light is fed to the optical fiber and propagates to the optical multiplexing coupler 3.

As for the spectral bandwidth of the individual laser light rays, their line width is preferably as narrow as possible to improve the coherent detection accuracy, and the line width of 100 kHz or less is appropriate to use.

As the laser light sources, a DFB (Distributed FeedBack) fiber laser or a DFB-LD (Laser Diode) can be used, for example.

The optical multiplexing coupler 3, receiving the CW laser light with frequency $f_1$ from the CW laser light source 1 and receiving the CW laser light with frequency $f_2$ from the CW laser light source 2, mixes the CW laser light with frequency $f_1$ and the CW laser light with frequency $f_2$, and supplies the CW laser light after the mixing to the optical branching coupler 4.

The optical branching coupler 4, receiving the CW laser light after the mixing from the optical multiplexing coupler 3, splits the optical power of the CW laser light into two optical paths at a prescribed ratio, and supplies first CW laser light to the light modulator 5 as the transmission seed light and second CW laser light to the optical multiplexing coupler 9 as the local oscillation light for coherent detection.

As for the dividing ratio of the optical power by the optical branching coupler 4, the ratio that has as small dependence as possible on the frequency of the CW laser light is appropriate.

The light modulator 5, receiving the transmission seed light with frequencies $f_1$ and $f_2$ from the optical branching coupler 4, generates pulses of the transmission seed light, adds modulation of the frequency (adds the medium frequency $f_M$ for making the coherent detection), and supplies the transmission seed light with the frequencies $f_1+f_M$ and $f_2+f_M$ to the optical fiber amplifier 6.

Using an acoustooptic modulator (AOM) as the light modulator 5, for example, will enable generating pulses from the CW laser light by cutting it out with a time gate, and enable adding the frequency shift at the same time.

Generally, the medium frequency $f_M$ is about a frequency from several tens to several hundred MHz, and an appropriate value is selected for the system.

The optical fiber amplifier 6, receiving the laser light which is the transmission seed light after the modulation output from the light modulator 5, amplifies the laser light and supplies to the optical circulator 7.

The optical circulator 7, receiving the laser light amplified by the optical fiber amplifier 6, passes the laser light to the transmit-receive optical system 8.

The transmit-receive optical system 8 emits the laser light passing through the optical circulator 7 into the atmosphere, and receives scattered light of the laser light, which is scattered by the aerosol in the atmosphere.

As the transmit-receive optical system 8, it is possible to use a telescope which can almost collimate the laser light and which enables adjustment of the focal length.

In addition, as the transmit-receive optical system 8, although it is possible to use a fiber collimator or the like, it is preferable to use one with a large aperture in order to reduce diffraction of the emitted laser light and to further increase the receiving efficiency.

Incidentally, the scattered light received by the transmit-receive optical system 8 is connected to the optical fiber.

Since the aerosol moves along the movement of the atmosphere (wind), the scattered light undergoes the Doppler shift.

Accordingly, if the Doppler shift the laser light with frequencies $f_1+f_M$ and $f_2+f_M$, which is the transmission light, undergoes is $f_{d1}$ and $f_{d2}$, the frequencies of the scattered light are $f_1+f_M+f_{d1}$ and $f_2+f_M+f_{d2}$, respectively.

The optical circulator 7 switches the optical path of the scattered light received by the transmit-receive optical system 8 to the optical multiplexing coupler 9, and causes the scattered light to propagate through the optical multiplexing coupler 9.

When the scattered light received by the transmit-receive optical system 8 passes through the optical circulator 7, the optical multiplexing coupler 9 mixes the scattered light with the local oscillation light with the frequencies $f_1$ and $f_2$ output from the optical branching coupler 4, and supplies the mixed light of the scattered light and the local oscillation light to the photodetector 10.

Receiving the mixed light output from the optical multiplexing coupler 9, the photodetector 10 detects the beat signal of the scattered light and the local oscillation light.

Since the scattered light included in the mixed light the photodetector 10 receives undergoes the frequency shift by the light modulator 5 and the Doppler shift involved in the movement of the aerosol, the frequencies of the beat signal detected by the photodetector 10 are $f_M+f_{d1}$ and $f_M+f_{d2}$, respectively.

When the photodetector 10 detects the beat signal, the signal processing unit 11 extracts from the beat signal the information about the target (such as information about the received signal strength of the scattered light, round-trip time, and Doppler frequency), and calculates the motion specifications of the target (such as the distance to the target and velocity distribution) from the information about the target.

Since the processing of calculating the motion specifications of the target from the information about the target is a publicly known technique, detailed description thereof will be omitted.

The present embodiment 1 employs as the optical fiber amplifier 6 an amplifier that corresponds to the wavelength band of the laser light used. For example, it can employ an optical fiber amplifier using a Nd (Neodymium) doped fiber or Yb (Ytterbium) doped fiber as long as the wavelength of the laser light is 1.06 µm band.

In addition, if the wavelength of the laser light is in a 1.55 µm band, it can employ an optical fiber amplifier using an Er (Erbium) doped fiber.

These optical fiber amplifiers have the gain bandwidth of about several nm to several tens of nm, and are able to amplify the laser light with a plurality of wavelengths, if they are within the gain band.

Here, if laser light with the strength not less than a fixed value is injected into the optical fiber, stimulated Brillouin scattering occurs.

Stimulated Brillouin scattering is a phenomenon in which an acoustic grating wave generated by incident laser light causes periodic modulation of the refractive index, and the periodic modulation of the refractive index functions as a diffraction grating, thereby scatting the incident laser light backward.

If stimulated Brillouin scattering occurs, since part of the power of the incident laser light, which exceeds the threshold of stimulated Brillouin scattering, is scattered backward of the optical fiber, the power of the laser light capable of entering the optical fiber is limited.

It is known that a common optical fiber has the gain bandwidth of stimulated Brillouin scattering of about several tens to 100 MHz.

Accordingly, when two laser light rays with frequency difference greater than 100 MHz (which corresponds to about 0.8 pm wavelength difference when the wavelength of the laser light is 1550 nm, for example) are injected into the optical fiber, the gain of stimulated Brillouin scattering for the two laser light rays can be made different. Accordingly, as for the two laser light rays, their optical powers can be each increased up to the incident power which is the threshold of stimulated Brillouin scattering.

Likewise, when inputting a plurality of laser light rays, making the frequency difference between the individual input laser light rays greater than 100 MHz makes it possible to alter the gain of stimulated Brillouin scattering for the individual laser light rays, and the optical powers of the individual laser light rays can be increased up to the incident power corresponding to the threshold of stimulated Brillouin scattering, thereby being able to increase the power of the laser light capable of entering the optical fiber.

In this way, using a plurality of laser light rays with frequency difference greater than the gain bandwidth of stimulated Brillouin scattering can increase the power of the laser light capable of entering the optical fiber.

In the optical fiber amplifier, there are some cases where the power of the laser light exceeds the threshold of stimulated Brillouin scattering in the process of increasing the power. In particular, when amplifying the pulsed light, since the peak output is apt to become large, stimulated Brillouin scattering is likely to generate. Accordingly, to prevent stimulated Brillouin scattering from occurring in general, the output optical power is adjusted before using by limiting pumping power to be input to the optical fiber amplifier.

In the present embodiment 1, since the difference between the frequency $f_1$ and $f_2$ of the CW laser light oscillated by the CW laser light sources 1 and 2 is greater than the gain bandwidth of stimulated Brillouin scattering occurring in the optical fiber as described above, the peak powers of the output pulsed light of the laser light can be increased up to the stimulated Brillouin scattering thresholds PSBS1 and PSBS2, respectively.

This enables the average power of the output light of the optical fiber amplifier 6 to be PS1+PS2, where PS1 and PS2 are average output power of the individual laser light rays (the average output power is given by the product of the peak power, the pulse width and the pulse-recurrence frequency of the pulsed light), thereby being able to increase the transmission light power as compared with the case of using a single light source (for example, using only one of the CW laser light source 1 and CW laser light source 2).

Thus, when PS1=PS2, it can double the power of the transmission light by using the two CW laser light sources.

As described above, using a plurality of laser light sources with frequency difference greater than the gain bandwidth of stimulated Brillouin scattering can make the power of the transmission light greater than when using a single light source, and improve the SN ratio by adding the received signals, which will be described later, thereby being able to implement highly sensitive, highly accurate measurement.

In addition, using a plurality of laser light sources can improve the energy-extraction efficiency because of an increase of the input power to the optical fiber amplifier 6, and can reduce the generation of an ASE (Amplified Spontaneous Emission) component during the laser light amplification. This offers an advantage of improving the efficiency of the optical fiber amplifier 6 and of reducing a noise component in the photodetector 10.

As for the lidar of FIG. 1, the Doppler shifts $f_{d1}$ and $f_{d2}$ the laser light emitted into the atmosphere from the transmit-receive optical system 8 undergoes are given by the following Expressions (1) and (2).

$$f_{d1} = 2V^*(f_1 + f_M)/c \quad (1)$$

$$f_{d2} = 2V^*(f_2 + f_M)/c \quad (2)$$

where V is the wind speed (moving velocity of aerosol) and c is the speed of light (it is assumed to be $3*10^8$ m/s, here).

The difference between the frequency $f_{d1}$ and frequency $f_{d2}$ can be obtained as $f_{d1} - f_{d2} = 2V(f_1 - f_2)/c$ from Expressions (1) and (2).

For example, assuming that the wavelength λ of the CW laser light oscillated by the CW laser light source 1 is 1550 nm, and the wavelength λ of the CW laser light oscillated by the CW laser light source 2 is 1549 nm, the frequency f of the CW laser light is obtained by f=c/λ, and the difference between the frequency $f_1$ and frequency $f_2$ is about 125 GHz.

It fulfills the foregoing condition that it is greater than the gain bandwidth of stimulated Brillouin scattering. In addition, assuming that the wind speed V is 1 m/s, the difference between the Doppler shifts $f_{d1}$ and $f_{d2}$ is about 0.8 kHz.

The spectral bandwidth of the scattered light, which is the received light, spreads because of variation of the wind speed within the measuring range. Accordingly, it becomes wider than the line width of the laser light source, and is about 1 MHz in general.

In contrast with this, the difference between the Doppler shifts $f_{d1}$ and $f_{d2}$, which is about 0.8 kHz in the foregoing case, is much smaller than the spectral bandwidth of the scattered light. Accordingly, the beat signal detected with the photodetector 10 is the superposition of the two spectral components $f_M + f_{d1}$ and $f_M + f_{d2}$.

However, since the phases of the frequency components do not coincide with each other, they strengthen or weaken each other so that when the strengths of the single frequency components $f_{d1}$ and $f_{d2}$ are $S_{fd1}$ and $S_{fd2}$, respectively, the signal strength of the combination of the $f_{d1}$ and $f_{d2}$ components measured by the signal processing unit 11 is $\sqrt{(S_{fd1}^2 + S_{fd2}^2)}$.

This enables increasing the signal strength as compared with the case of using the light source singly, in which the signal strength of the scattered light which is the received light is $S_{fd1}$ or $S_{fd2}$. Accordingly, the SN ratio is improved, which enables the highly sensitive and highly accurate measurement.

In addition, when $S_{fd1} = S_{fd2} = S_{fd}$ in the foregoing example, the signal strength of the combination of the $f_{d1}$ and $f_{d2}$ components measured by the signal processing unit 11 is given by $(\sqrt{2})^* S_{fd}$, which means that using the two CW laser light sources 1 and 2 can increase the signal strength of the scattered light which is the received light by a factor of $\sqrt{2}$.

In this way, using the CW laser light sources with a plurality of frequencies can increase the signal strength of the scattered light which is the received light. This makes it possible to increase the SN ratio of the scattered light which is the received light, and to implement highly sensitive, highly accurate measurement.

In addition, although it is assumed in the foregoing example that the wind speed V is 1 m/s, the difference between the Doppler shifts $f_{d1}$ and $f_{d2}$ will increase with the wind speed V. Accordingly, when the wind speed V increases, the overlap of the frequency components $f_{d1}$ and $f_{d2}$ cannot be maintained sufficiently. In such a case, the difference between the Doppler shifts $f_{d1}$ and $f_{d2}$ can be reduced by reducing the frequency difference between the laser light sources $f_1$ and $f_2$.

Thus, by setting the frequencies $f_1$ and $f_2$ of the CW laser light rays oscillated by the CW laser light sources 1 and 2 while considering the frequency domain to be measured and the measurement accuracy required, the overlap of the frequency components of the scattered light which is the received light can be maintained. This enables increasing the signal strength of the scattered light which is the received light.

As is clear from the foregoing description, according to the present embodiment 1, it comprises the CW laser light sources 1 and 2 that oscillate the CW laser light rays with wavelengths different from each other; the optical multiplexing coupler 3 that mixes the CW laser light rays oscillated by the CW laser light sources 1 and 2; the optical branching coupler 4 that splits the CW laser light mixed by the optical multiplexing coupler 3; the light modulator 5 that modulates the first CW laser light split by the optical branching coupler 4; and the optical fiber amplifier 6 that amplifies the laser light modulated by the light modulator 5, wherein the transmit-receive optical system 8 irradiates the target with the laser light amplified by the optical fiber amplifier 6 and receives the scattered light of the laser light by the target. Accordingly, it offers an advantage of being able to implement high SN ratio measurement with simple arrangement without complicating the configuration.

More specifically, according to the present embodiment 1, the single transmit-receive optical system 8 transmits and receives the laser light based on the two CW laser light sources 1 and 2 so that it can increase the signal strength of the scattered light which is the received light. Accordingly, it is not necessary to provide photodetectors for the individual wavelengths of the CW laser light sources 1 and 2. As a result, it offers an advantage of being able to simplify the configuration of the apparatus and to reduce the size and cost of the apparatus.

In addition, it is not necessary for the foregoing configuration to comprise the optical element for separating the scattered light which is the received light into the individual wavelengths of the laser light. Accordingly, it can prevent the loss of the optical element for the received light, thereby being able to maintain the high signal strength.

In addition, as for the plane of polarization of the local oscillation light and that of the scattered light which is the received light, although they can be aligned by the photodetector 10 to enable efficient coherent detection, they can be brought into agreement using a polarization plane controller or the like not shown.

Furthermore, the plane of polarization of the local oscillation light and that of the scattered light can be aligned by using polarization maintaining optical fibers as the optical fibers connecting the individual optical elements and by using polarization maintaining optical elements as the individual optical elements without using a polarization plane controller or the like, which enables simplification of the configuration of the apparatus.

Embodiment 2

The foregoing embodiment 1 shows an example comprising the two CW laser light sources 1 and 2 that oscillate the CW laser light rays with wavelengths different from each other. However, the number of the wavelengths of the laser light can be increased as long as the gain of the optical fiber amplifier 6 is large enough and the power of the laser light does not destroy the optical fibers or the optical elements on the transmitting optical path.

In the present embodiment 2, a lidar comprising n CW laser light sources will be described.

Figure 2:
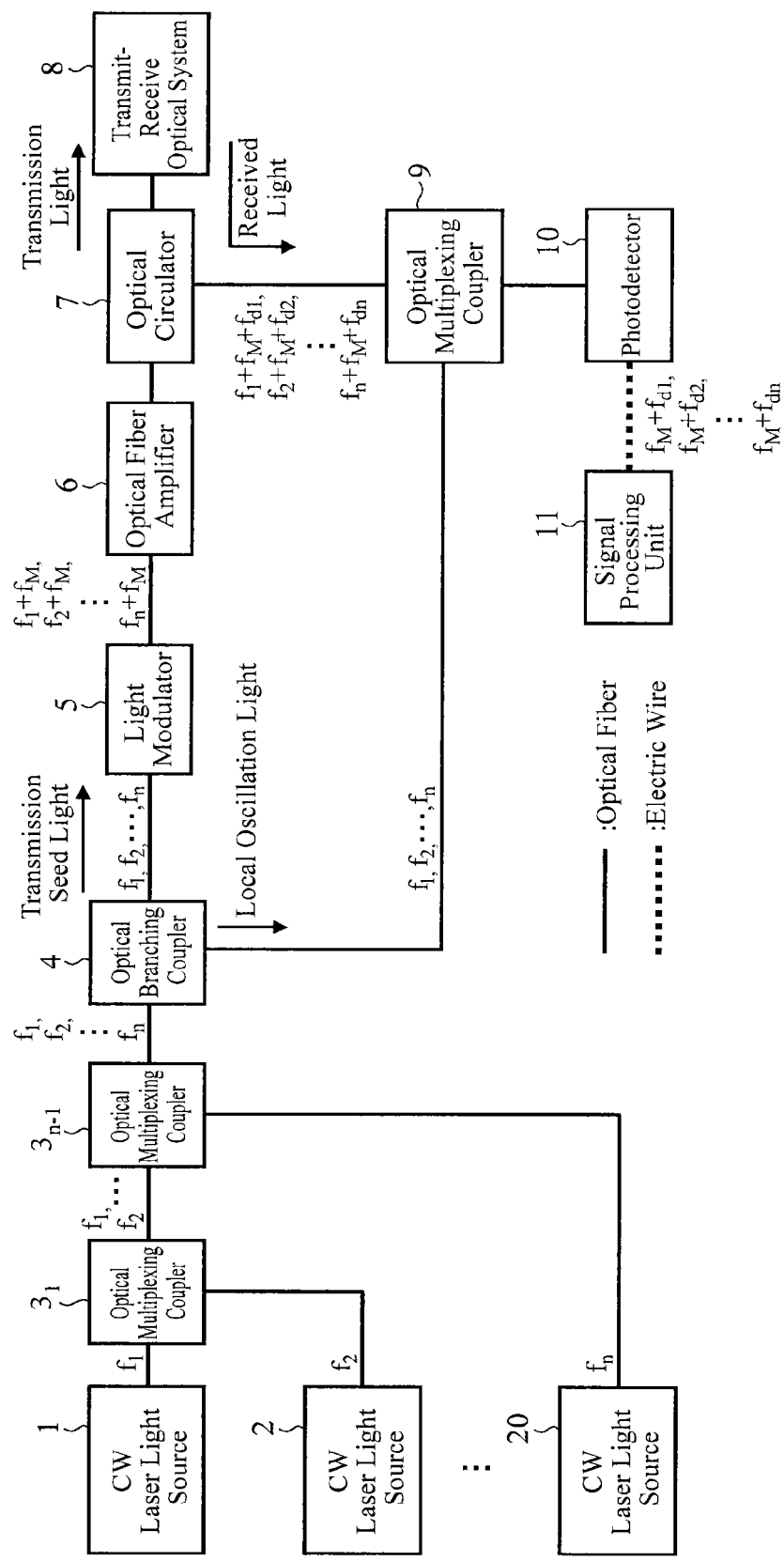
FIG. 2 is a block diagram showing a configuration of a lidar of an embodiment 2 in accordance with the present invention.

FIG. 2 is a block diagram showing a configuration of a lidar of the embodiment 2 in accordance with the present invention. In FIG. 2, since the same reference numerals as those of FIG. 1 designate the same or like components, their description will be omitted.

A CW laser light source 20 is a light source that oscillates CW laser light with frequency $f_n$.

The example of FIG. 2 comprises n (n=1, 2, . . . , n) CW laser light sources.

It is assumed here that the frequencies $f_1, f_2, \ldots, f_n$ of the CW laser light rays oscillated by the n CW laser light sources are within the gain band of the optical fiber amplifier 6, and that the individual frequency differences (such as the difference between frequency $f_1$ and frequency $f_2$, the difference between frequency $f_2$ and frequency $f_3$, and the difference between frequency $f_{n-1}$ and frequency $f_n$) are greater than the gain bandwidth of stimulated Brillouin scattering occurring in the optical fiber.

The optical multiplexing coupler $3_1$ is an optical element that mixes the CW laser light with frequency $f_1$ oscillated by the CW laser light source 1 and the CW laser light with frequency $f_2$ oscillated by the CW laser light source 2.

The optical multiplexing coupler $3_{n-1}$ is an optical element that mixes the CW laser light mixed by the optical multiplexing coupler $3_{n-2}$ and the CW laser light with frequency $f_n$ oscillated by the CW laser light source 20.

Incidentally, n−1 optical multiplexing couplers $3_1, \ldots, 3_{n-1}$ constitute a first optical multiplexer.

Next, the operation will be described.

In the present embodiment 2, the n−1 optical multiplexing couplers $3_1, \ldots, 3_{n-1}$ mix the CW laser light with the first frequency $f_1$ and the CW laser light with the second to nth frequencies $f_2, \ldots, f_n$ in order.

Thus, the CW laser light supplied from the final-stage optical multiplexing coupler $3_{n-1}$ to the optical branching coupler 4 includes the frequencies $f_1, f_2, \ldots, f_n$.

Since the processing from the optical branching coupler 4 onward is the same as that of the foregoing embodiment 1, the description thereof will be omitted. However, mixing the n CW laser light rays with different frequencies can increase the power of the laser light amplified by the optical fiber amplifier 6 by a factor of n as compared with the case of using only a single CW laser light source (on the assumption that the output powers of the individual wavelengths of the optical fiber amplifier 6 are the same).

This increases the input power to the optical fiber amplifier 6, and hence can improve the energy-extraction efficiency. In addition, since this enables reducing the ASE components during the laser light amplification, it offers an advantage of improving the efficiency of the optical fiber amplifier 6, and of reducing the noise components of the photodetector 10.

In addition, the photodetector 10 can produce beat signals for the n laser light rays. As described above, when the signal strength of the single frequency component is $S_{fd}$, the signal strength of the combination of the components is increased to $(\sqrt{n})*S_{fd}$. Accordingly, the present embodiment can improve the SN ratio and implement highly sensitive, highly accurate measurement.

In this way, increasing the number of the CW laser light sources can increase the signal strength.

In addition, as described above, by setting the frequencies $f_1, f_2, \ldots, f_n$ of the CW laser light rays oscillated by the laser light sources while considering the frequency domain to be measured and the measurement accuracy required, the overlap of the frequency components of the scattered light which is the received light can be maintained. This enables increasing the signal strength of the scattered light which is the received light.

As described above, the present embodiment 2 can increase the signal strength of the scattered light with an increase in the number of the CW laser light sources, thereby being able to implement highly sensitive, highly accurate measurement.

Embodiment 3

Figure 3:
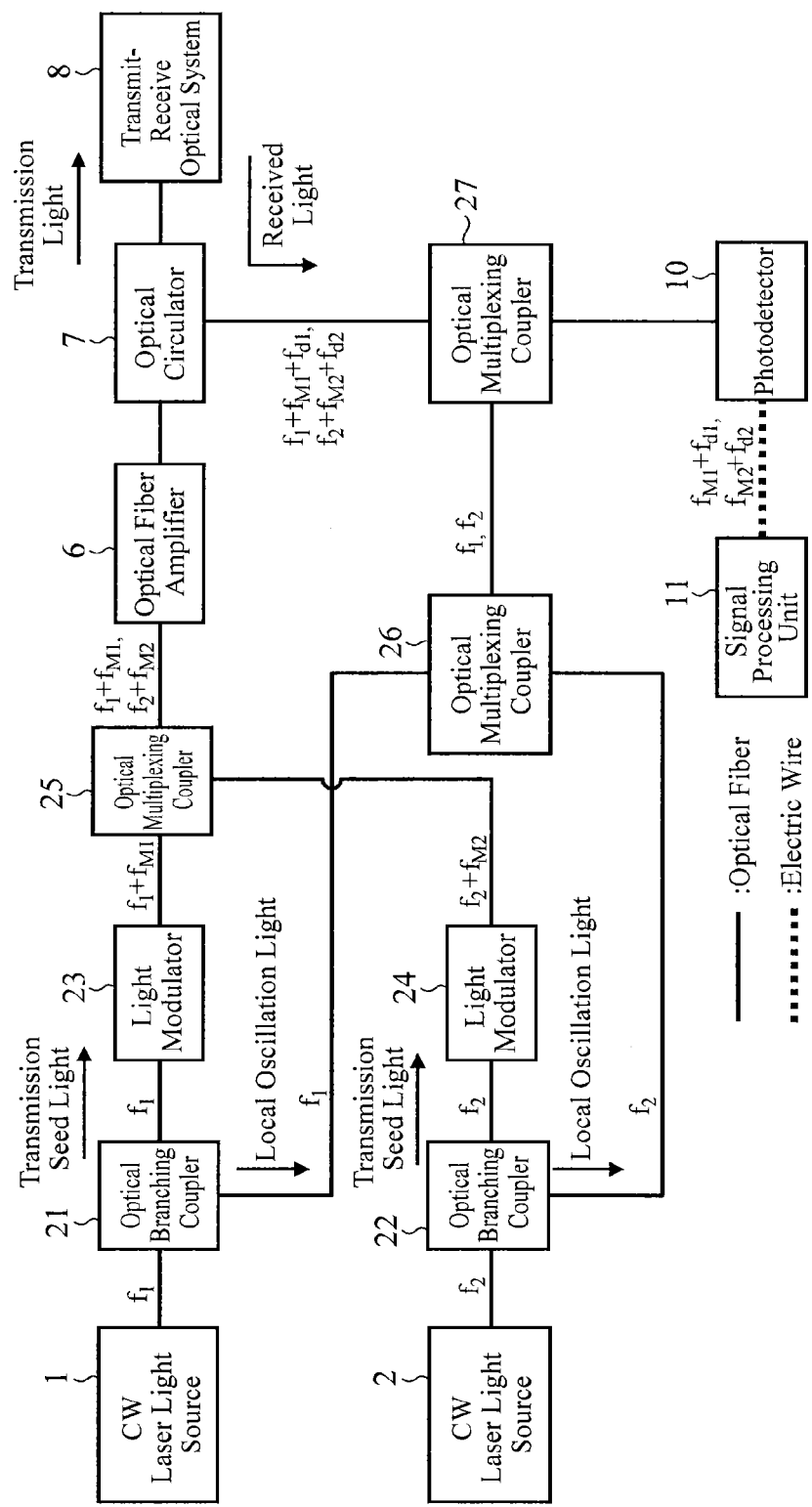
FIG. 3 is a block diagram showing a configuration of a lidar of an embodiment 3 in accordance with the present invention.

FIG. 3 is a block diagram showing a configuration of a lidar of an embodiment 3 in accordance with the present invention. In FIG. 3, since the same reference numerals as those of FIG. 1 designate the same or like components, their description will be omitted.

The optical branching coupler 21 is an optical element that splits the CW laser light with frequency $f_1$ oscillated by the CW laser light source 1 into two parts, and that supplies first CW laser light to a light modulator 23 as the transmission seed light and second CW laser light to an optical multiplexing coupler 26 as the local oscillation light.

The optical branching coupler 22 is an optical element that splits the CW laser light with frequency $f_2$ oscillated by the CW laser light source 2 into two parts, and that supplies first CW laser light to a light modulator 24 as the transmission seed light and second CW laser light to an optical multiplexing coupler 26 as the local oscillation light.

Incidentally, the optical branching couplers 21 and 22 constitute an optical branching unit.

The light modulator 23 performs the processing of supplying the transmission seed light with frequency $f_1+f_{M1}$ to the optical multiplexing coupler 25 by generating pulses from the transmission seed light with frequency $f_1$ output from the optical branching coupler 21 and by adding modulation of the frequency (adds medium frequency $f_{M1}$ at the time of carrying out the coherent detection).

The light modulator 24 performs the processing of supplying the transmission seed light to the optical multiplexing coupler 25 by generating pulses from the transmission seed light with frequency $f_2$ output from the optical branching coupler 22 and by adding modulation of the frequency (adds medium frequency $f_{M2}$ at the time of carrying out the coherent detection).

The optical multiplexing coupler 25 is an optical element that mixes the transmission seed light with frequency $f_1+f_{M1}$ modulated by the light modulator 23 and the transmission seed light with frequency $f_2+f_{M2}$ modulated by the light modulator 24, and supplies the transmission seed light after the mixing (transmission seed light with frequencies $f_1+f_{M1}$ and $f_2+f_{M2}$) to the optical fiber amplifier 6. Incidentally, the optical multiplexing coupler 25 constitutes a first optical multiplexer.

The optical multiplexing coupler 26 is an optical element that mixes the local oscillation light with frequency $f_1$ output from the optical branching coupler 21 and the local oscillation light with frequency $f_2$ output from the optical branching coupler 22, and supplies the local oscillation light after mixing (local oscillation light with frequencies $f_1$ and $f_2$) to the optical multiplexing coupler 27. Incidentally, the optical multiplexing coupler 26 constitutes a second optical multiplexer.

The optical multiplexing coupler 27 is an optical element that mixes the scattered light that is received by the transmit-receive optical system 8 and passes through the optical circulator 7 and the local oscillation light output from the optical multiplexing coupler 26, and outputs the mixed light of the scattered light and the local oscillation light. Incidentally, the optical multiplexing coupler 27 constitutes a third optical multiplexer.

Next, the operation will be described.

The CW laser light source 1 oscillates the CW laser light with frequency $f_1$ in the same manner as in the foregoing embodiment 1. The CW laser light is connected to the optical fiber and is propagated to the optical branching coupler 21.

The CW laser light source 2 oscillates the CW laser light with frequency $f_2$ in the same manner as in the foregoing embodiment 1. The CW laser light is connected to the optical fiber and is propagated to the optical branching coupler 22.

The optical branching coupler 21, receiving the CW laser light with frequency $f_1$ from the CW laser light source 1, splits the CW laser light into two parts, supplies the first CW laser light to the light modulator 23 as the transmission seed light, and supplies the second CW laser light to the optical multiplexing coupler 26 as the local oscillation light.

In addition, the optical branching coupler 22, receiving the CW laser light with frequency $f_2$ from the CW laser light source 2, splits the CW laser light into two parts, supplies the first CW laser light to the light modulator 24 as the transmission seed light, and supplies the second CW laser light to the optical multiplexing coupler 26 as the local oscillation light.

The light modulator 23, receiving the transmission seed light with frequency $f_1$ from the optical branching coupler 21, generates pulses of the transmission seed light, and adds the modulation of the frequency (adds the medium frequency $f_{M1}$ at the time of carrying out the coherent detection), thereby supplying the transmission seed light with frequency $f_1+f_{M1}$ to the optical multiplexing coupler 25.

Likewise, the light modulator 24, receiving the transmission seed light with frequency $f_2$ from the optical branching coupler 22, generates pulses of the transmission seed light, and adds the modulation of the frequency (adds the medium frequency $f_{M2}$ at the time of carrying out the coherent detection), thereby supplying the transmission seed light with frequency $f_2+f_{M2}$ to the optical multiplexing coupler 25.

As the light modulators 23 and 24, an acoustooptic modulator can be used as in the light modulator 5 of FIG. 1. This will enable generating pulses from the CW laser light by cutting it out with a time gate to, and enable adding the frequency shift at the same time.

Here, the frequency modulation $f_{M1}$ by the light modulator 23 and the frequency modulation $f_{M2}$ by the light modulator 24 are set at different values.

In addition, they are set so as to satisfy the conditions of $(f_{M1}+f_{d1})<f_{M2}+f_{d2})$ or $(f_{M1}+f_{d1})>f_{M2}+f_{d2})$.

This enables the post-stage signal processing unit 11 to discriminate between the two frequency components ($f_{M1}+f_{d1}$, $f_{M2}+f_{d2}$) of the beat signal detected by the photodetector 10, thereby enabling measuring the signal strength of the individual frequency components separately.

For example, assuming that $f_{M1}$=50 MHz, $f_{M2}$=100 MHz, and $f_{d1}=f_{d2}$=10 MHz, then ($f_{M1}+f_{d1}$=60 MHz)<($f_{M2}+f_{d2}$=110 MHz). Accordingly, it can discriminate that the signal with a lower frequency is the scattered light corresponding to the laser light oscillated by the CW laser light source 1, and that the signal with a higher frequency is the scattered light corresponding to the laser light oscillated by the CW laser light source 2.

The optical multiplexing coupler 25 mixes the transmission seed light with frequency $f_1+f_{M1}$ modulated by the light modulator 23 and the transmission seed light with frequency $f_2+f_{M2}$ modulated by the light modulator 24, and supplies the optical fiber amplifier 6 with the transmission seed light after the mixing (the transmission seed light with frequencies $f_1+f_{M1}$ and $f_2+f_{M2}$).

Receiving the laser light which is the transmission seed light with frequencies $f_1+f_{M1}$ and $f_2+f_{M2}$ from the optical multiplexing coupler 25, the optical fiber amplifier 6 amplifies the laser light as in the foregoing embodiment 1, and supplies to the optical circulator 7.

The optical circulator 7, receiving the laser light amplified by the optical fiber amplifier 6, passes the laser light to the transmit-receive optical system 8 as in the foregoing embodiment 1.

As in the foregoing embodiment 1, the transmit-receive optical system 8 emits the laser light passing through the optical circulator 7 into the atmosphere, and receives the scattered light of the laser light scattered by the aerosol suspended in the atmosphere.

The optical circulator 7 switches the optical path of the scattered light received by the transmit-receive optical system 8 to the optical multiplexing coupler 27, and causes the scattered light to propagate to the optical multiplexing coupler 27.

The optical multiplexing coupler 26, receiving the local oscillation light with frequency $f_1$ from the optical branching coupler 21 and the local oscillation light with frequency $f_2$ from the optical branching coupler 22, mixes the local oscillation light with frequency $f_1$ and the local oscillation light with frequency $f_2$, and supplies the optical multiplexing coupler 27 with the local oscillation light after the mixing (local oscillation light with frequencies $f_1$ and $f_2$).

When the scattered light received by the transmit-receive optical system 8 passes through the optical circulator 7, the optical multiplexing coupler 27 mixes the scattered light and the local oscillation light with frequencies $f_1$ and $f_2$ output from the optical multiplexing coupler 26, and supplies the mixed light of the scattered light and the local oscillation light to the photodetector 10.

As in the foregoing embodiment 1, the photodetector 10 receives the mixed light output from the optical multiplexing coupler 27, and detects the beat signal of the scattered light and the local oscillation light.

As for the scattered light included in the mixed light the photodetector 10 receives, since it undergoes the frequency shift by the light modulators 23 and 24 and the Doppler shift involved in the movement of the aerosol, the frequencies of the beat signal detected by the photodetector 10 are $f_{M1}+f_{d1}$ and $f_{M2}+f_{d2}$.

When the photodetector 10 detects the beat signal, the signal processing unit 11 extracts the information about the target (information such as the received signal strength of the scattered light, round-trip time, and Doppler frequency) from the beat signal as in the foregoing embodiment 1, and calculates the motion specifications of the target (such as the distance to the target and the velocity distribution) from the information about the target.

Incidentally, since the signal processing unit 11 can separately measure the Doppler shift $f_{d1}$ corresponding to the laser light oscillated by the CW laser light source 1 and the Doppler shift $f_{d2}$ corresponding to the laser light oscillated by the CW laser light source 2, the present embodiment can improve the SN ratio by integrating measured values, thereby being able to carry out highly sensitive, highly accurate measurement.

As described above, since the Doppler shift varies in dependence on the wind speed V and the frequency of the laser light transmitted, only setting the frequency $f_1$ and frequency $f_2$ of the laser light at different values can make the Doppler shift $f_{d1}$ and Doppler shift $f_{d2}$ different. In addition, the light modulators 23 and 24 can add different frequency shifts so that even if the difference between the Doppler shift $f_{d1}$ and the Doppler shift $f_{d2}$ is small, it can add the difference to the frequencies of the scattered light easily. Accordingly, the signal processing unit 11 can discriminate the two scattered light rays because of the difference of the frequency components.

Incidentally, it is enough in the present embodiment 3 that the difference between the frequencies $f_1$ and $f_2$ of the CW laser light rays oscillated by the CW laser light sources 1 and 2 is greater than the gain bandwidth of stimulated Brillouin scattering, and it is not necessary to consider the overlap of the components of frequency $f_1$ and frequency $f_2$ as in the foregoing embodiments 1 and 2.

Accordingly, the present embodiment can increase the wavelength difference between the CW laser light sources 1 and 2, thereby being able to increase a degree of freedom of the devices used.

In addition, the light modulators 23 and 24 can synchronize the timing of generating the pulses of the laser light by using a signal generator not shown or the like.

This enables synchronizing the rise time of the pulsed laser light to be mixed by the optical multiplexing coupler 25, and synchronizing the emitting timing of the individual frequency transmission light rays. Accordingly, the present embodiment can simplify the processing of measuring the round-trip time of the transmission light by the signal processing unit 11.

Although the present embodiment 3 shows the example comprising the two CW laser light sources 1 and 2, it can comprise n CW laser light sources as in the foregoing embodiment 2.

In this case, it is enough for the lidar to comprise for each CW laser light source an optical branching coupler that splits the CW laser light into two parts and a light modulator that provides a different frequency shift, and to comprise an optical multiplexing coupler that mixes the transmission seed light after modulation by the plurality of light modulators in order, and an optical multiplexing coupler that mixes the local oscillation light split by the optical branching couplers in order.

In this case, by setting the frequency shifts by the individual light modulators at different values as described above, the signal processing unit 11 can measure the Doppler shifts for the individual laser light rays separately. Accordingly, it can improve the SN ratio by integrating the measured values, thereby being able to implement highly sensitive, highly accurate measurement.

In this case also, the number of the scattered light rays which are the received light can be increased with an increase in the number of the used CW laser light sources, which will enable increasing the degree of improvement of the SN ratio due to the integration.

Embodiment 4

Although the foregoing embodiment 2 shows the example that comprises n CW laser light sources to oscillate n CW laser light rays with frequencies $f_1, f_2, \ldots, f_n$, a configuration is also possible which comprises only a single CW laser light source that oscillates CW laser light with n frequencies $f_1, f_2, \ldots, f_n$.

Figure 4:
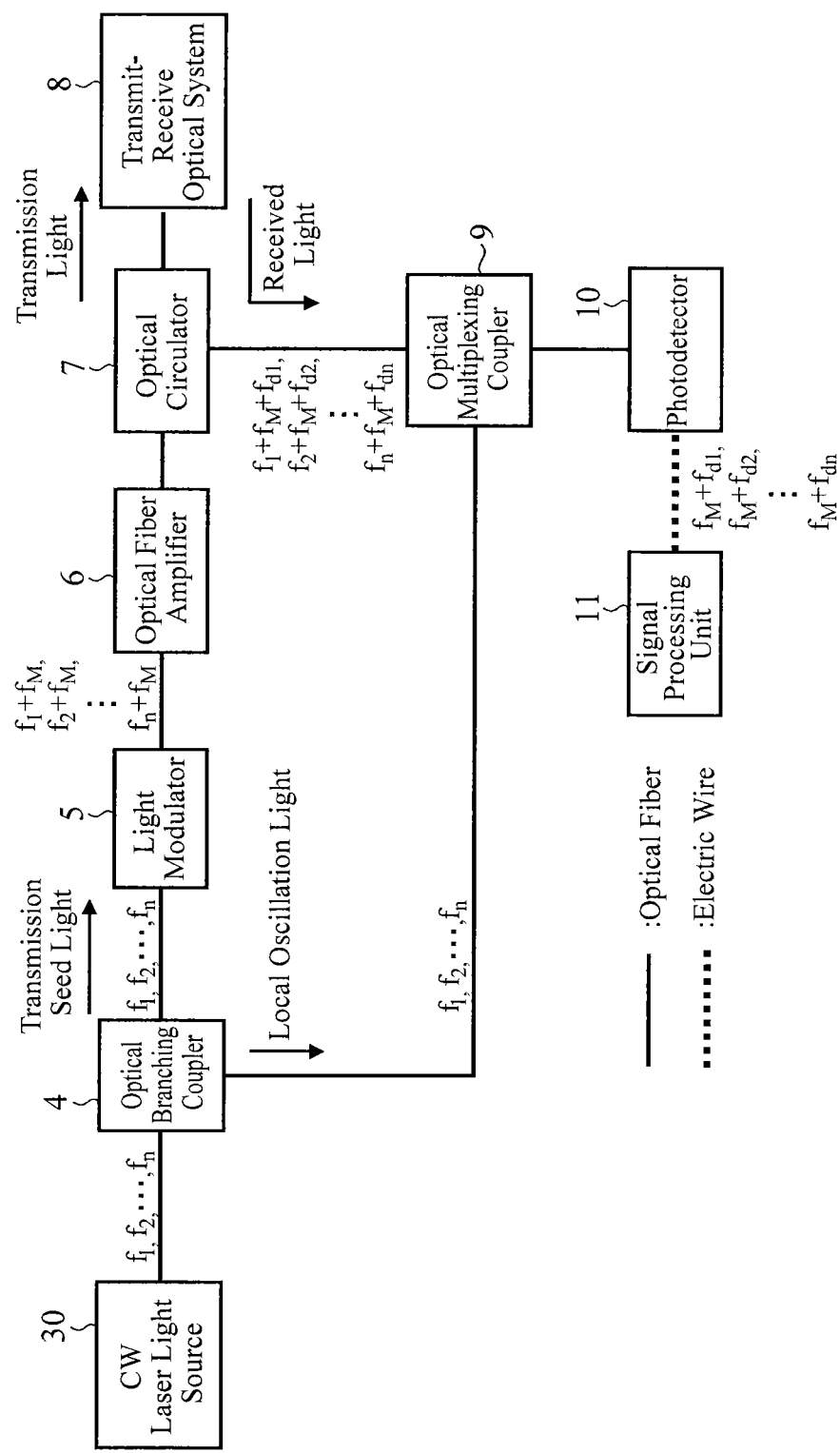
FIG. 4 is a block diagram showing a configuration of a lidar of an embodiment 4 in accordance with the present invention.

FIG. 4 is a block diagram showing a configuration of a lidar of an embodiment 4 in accordance with the present invention. In FIG. 4, since the same reference numerals as those of FIG. 1 designate the same or like components, their description will be omitted.

The CW laser light source 30 is a light source that oscillates CW laser light with n frequencies $f_1, f_2, \ldots, f_n$.

It is assume here that the frequencies $f_1, f_2, \ldots, f_n$ of the CW laser light oscillated by the CW laser light source 30 differ from each other, and that the differences between the individual frequencies $f_1, f_2, \ldots, f_n$ are greater than the gain bandwidth of stimulated Brillouin scattering occurring in the optical fibers.

Since the present embodiment comprises the CW laser light source 30 that oscillates the CW laser light with n frequencies $f_1, f_2, \ldots, f_n$, it obviates the necessity of the optical multiplexing couplers $3_1, \ldots, 3_{n-1}$.

Accordingly, the present embodiment can offer not only the same advantages of the foregoing embodiment 2, but also advantages of being able to reduce the number of components and simplify the configuration, and to reduce the size and cost of the apparatus.

Incidentally, the configuration of comprising the CW laser light source 30 that oscillates the CW laser light with n frequencies $f_1, f_2, \ldots, f_n$ can be applied to the lidar of FIG. 3.

In this case also, it can offer not only the same advantages of the example that comprises the plurality of CW laser light sources, but also advantages of being able to reduce the number of components and simplify the configuration, and to reduce the size and cost of the apparatus.

Embodiment 5

Figure 5:
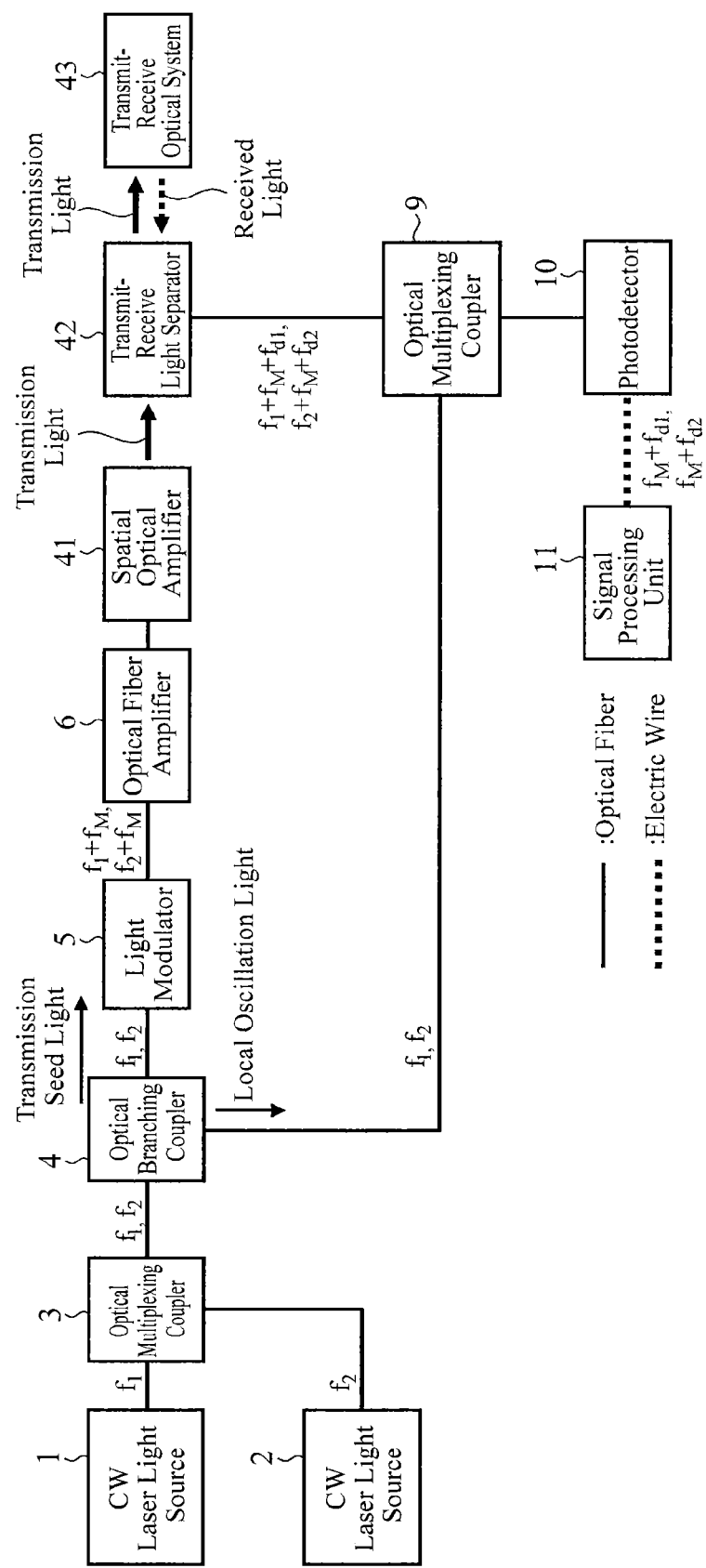
FIG. 5 is a block diagram showing a configuration of a lidar of an embodiment 5 in accordance with the present invention.

FIG. 5 is a block diagram showing a configuration of a lidar of an embodiment 5 in accordance with the present invention. In FIG. 5, since the same reference numerals as those of FIG. 1 designate the same or like components, their description will be omitted.

A spatial optical amplifier 41 is laser light amplifier that further amplifies the laser light amplified by the optical fiber amplifier 6.

A transmit-receive light separator 42 is an optical element that passes the laser light amplified by the spatial optical amplifier 41 to a transmit-receive optical system 43, and that switches the optical path of the laser light (scattered light received by the transmit-receive optical system 43) propagating in the direction opposite to the former laser light to the optical multiplexing coupler 9 so as to cause the laser light to propagate to the optical multiplexing coupler 9.

The transmit-receive optical system 43 irradiates a target (such as the atmosphere, particles or aerosol in the atmosphere, a flying object, and a building) with the laser light passing through the transmit-receive light separator 42, and performs the processing of receiving the scattered light of the laser light by the target.

The present embodiment 5 is the same as the foregoing embodiment 1 except that the spatial optical amplifier 41 is placed after the optical fiber amplifier 6, the transmit-receive light separator 42 is placed instead of the optical circulator 7, and the transmit-receive optical system 43 is disposed instead of the transmit-receive optical system 8.

Incidentally, the propagation route of the laser light from the spatial optical amplifier 41 to the transmit-receive optical system 43 is space.

The spatial optical amplifier 41 comprises a solid-state laser medium like a rod type, slab type, disk type, or planar waveguiding type laser medium, and an exciting light source.

As the solid-state laser medium, although a material can be used which has ions like Nd, Yb, Er, Tm and Ho doped into a basic material such as a crystal, ceramic and glass, a material that has gain in the wavelength band of the laser light is used.

In addition, as the exciting light source, an LD (laser diode) or the like is used which outputs laser light with a wavelength that is absorbed into the laser medium to produce gain.

Using a solid-state laser medium with a planar waveguiding structure can increase the power density of the laser light, thereby enabling efficient amplification. In addition, it can perform amplification without deteriorating the space propagation mode of the output light according to the guided mode of the waveguide.

The spatial optical amplifier 41 nearly collimates the laser light amplified by the optical fiber amplifier 6 with an optical element like a lens, and receives and amplifies the input laser light by adjusting the beam diameter in accordance with the shape of the solid-state laser medium.

As for the laser light output from the spatial optical amplifier 41, since it is nearly collimated with the optical element like a lens as described above, it is output as the nearly collimated transmission light.

Here, since the spatial optical amplifier 41 uses a solid-state laser medium, it can achieve the amplification without limitation of the power density, thereby being able to amplify to any power.

In addition, the solid-state laser medium can amplify laser light with a plurality of wavelengths as long as they are within the gain band.

Receiving the laser light from the spatial optical amplifier 41, the transmit-receive light separator 42 passes the laser light to the transmit-receive optical system 43.

In addition, the transmit-receive light separator 42 separates the scattered light received by the transmit-receive optical system 43 from the transmitting optical path of the laser light, connects the scattered light to the optical fiber via an optical element like a lens, and causes it to propagate to the optical multiplexing coupler 9.

To separate the receiving optical path from the transmitting optical path, a combination of a polarizer and a quarter-wave plate can implement it, for example. In addition, a space type optical circulator can be used as well.

The transmit-receive optical system 43 magnifies the diameter of the nearly collimated laser light, irradiates the atmosphere with it, and receives laser light scattered by the aerosol.

The transmit-receive optical system 43, receiving the scattered light of the laser light by the aerosol, nearly collimates the scattered light, and causes it to propagate in the direction opposite to the laser light which is the transmission light, thereby supplying it to the transmit-receive light separator 42. The scattered light is connected to the optical fiber through the transmit-receive light separator 42.

Although the transmit-receive optical system 43 can employ a telescope capable of nearly collimating the laser light to be emitted and of adjusting the focal length, it is preferable to use a telescope with a large aperture to further increase the receiving efficiency by reducing the diffraction occurring in the laser light to be emitted.

As the foregoing embodiment 1, the present embodiment 5 can also increase the power of the laser light amplified by the optical fiber amplifier 6 up to twice as that of the case of using only a single CW laser light source. In addition, since the spatial optical amplifier 41 can further increase the power of the laser light, the present embodiment 5 can further increase the transmission light power.

In addition, by increasing the power of the laser light to be amplified by the optical fiber amplifier 6, the spatial optical amplifier 41 can operate near the saturation amplification because of increased power of the input laser light, thereby being able to carry out efficient amplification. Furthermore, since the increasing power of the input laser light can improve the energy-extraction efficiency within the amplifier, the present embodiment can reduce generation of the ASE components during the laser light amplification, thereby being able to achieve efficient amplification.

Accordingly, it can compensate for the shortage of the power of the laser light due to the limitation of the output power of the optical fiber amplifier 6 because of the stimulated Brillouin scattering.

In addition, since the present embodiment 5 can increase the power of the laser light through the spatial optical amplifier 41, it can increase the strength of the scattered light which is the received light, and hence it can increase the signal strength of the scattered light for the individual transmission light.

Furthermore, since the superposition of the scattered light is measured as described above, the present embodiment can increase the signal strength, improve the SN ratio, and carry out highly sensitive, highly accurate measurement.

Although the present embodiment 5 shows the example that applies the configuration comprising the spatial optical amplifier 41 and the transmit-receive light separator 42 to the lidar of the foregoing embodiment 1, this is not essential. For example, it is applicable to the lidars of the foregoing embodiments 2-4.

When applying it to the lidar that transmits the laser light with multiple wavelengths, the output power of the optical fiber amplifier 6 increases because of a large number of the wavelengths of the laser light to be transmitted. Thus, the spatial optical amplifier 41 can carry out efficient amplification near the saturation amplification. This will further increase the power of the laser light, and hence can increase the signal strength of the scattered light which is the received light, thereby being able to implement highly sensitive, highly accurate measurement.

In addition, a configuration is also possible which further comprises at least an optical fiber amplifier or a spatial optical amplifier between the optical fiber amplifier 6 and the spatial optical amplifier 41. In addition, a configuration is also possible which comprises a combination of a plurality of these amplifiers.

In this case, since the increasing power of the laser light can be input to the final-stage spatial optical amplifier 41, it can carry out more efficient amplification near the saturation amplification. Since this enables a further increase in the power of the laser light, the present embodiment 5 can further increase the signal strength of the scattered light which is the received light. Accordingly, it can implement highly sensitive, highly accurate measurement.

Embodiment 6

Figure 6:
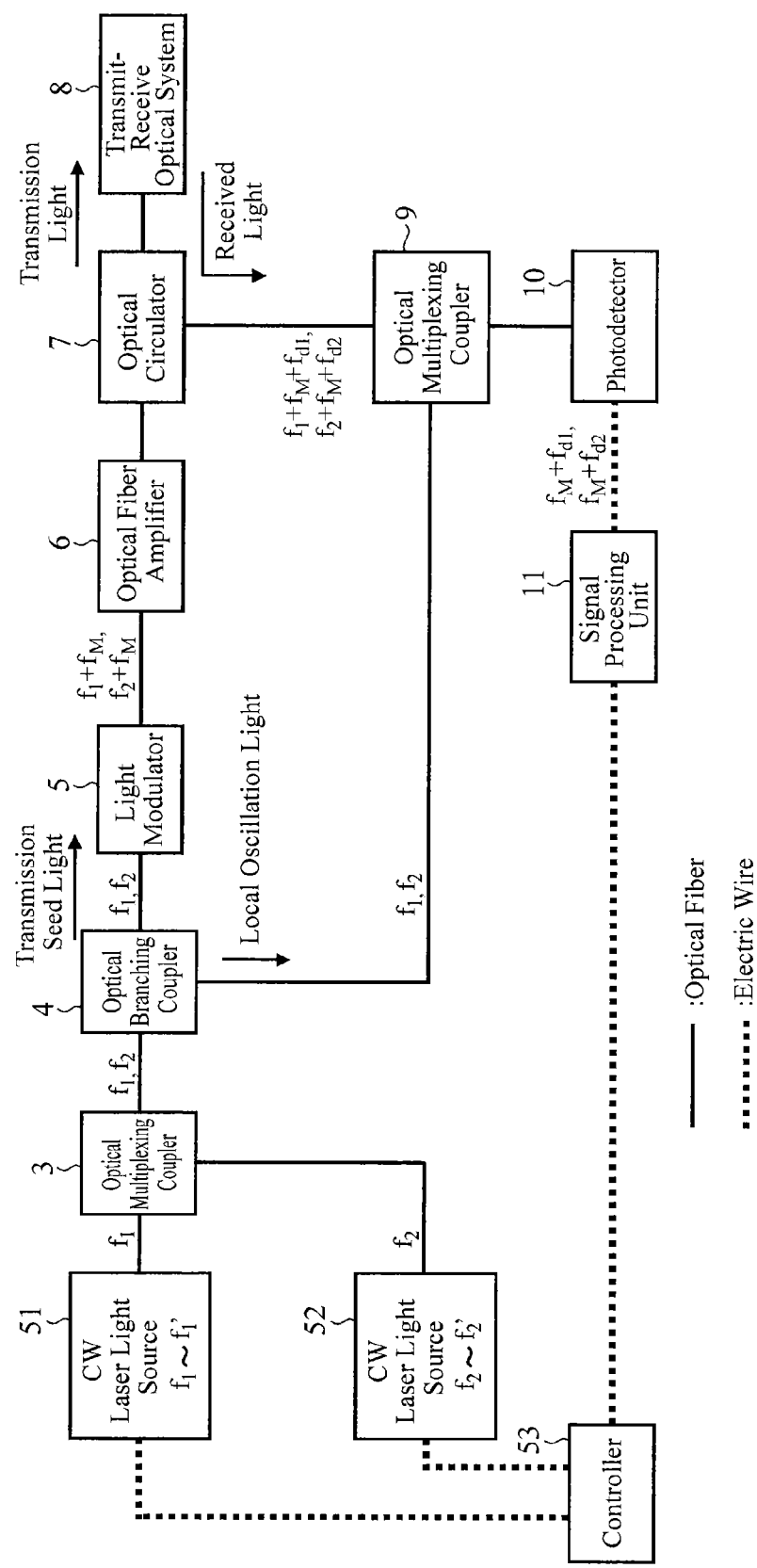
FIG. 6 is a block diagram showing a configuration of a lidar of an embodiment 6 in accordance with the present invention.

FIG. 6 is a block diagram showing a configuration of a lidar of an embodiment 6 in accordance with the present invention. In FIG. 6, since the same reference numerals as those of FIG. 1 designate the same or like components, their description will be omitted.

The lidar of FIG. 6 is assumed to be a coherent Doppler lidar that irradiates the atmosphere with a laser pulsed light, receives scattered light from an aerosol (particles such as dust suspended in the atmosphere), and measures wind speed by detecting the Doppler shift of the scattered light.

The CW laser light source 51 is a light source that oscillates CW laser light with frequency $f_1$ to $f_1'$ under the control of the controller 53.

The CW laser light source 52 is a light source that oscillates CW laser light with frequency $f_2$ to $f_2'$ under the control of the controller 53.

Incidentally, the CW laser light sources 51 and 52, which are a light source capable of varying the oscillation wavelength of the CW laser light, can alter the oscillation wavelength by varying the temperature or driving current of the device when using a DFB (Distributed Feed-Back) fiber laser or a DFB-LD (Laser Diode) which is a semiconductor laser as the CW laser light sources 51 and 52, for example.

The controller 53 controls the wavelengths of the CW laser light oscillated by the CW laser light sources 51 and 52 by controlling the operation state of the CW laser light sources 51 and 52 in accordance with the information about a target extracted by the signal processing unit 11 (information such as the received signal strength of the scattered light, round-trip time, Doppler frequency).

In addition, the controller 53 can even start/stop the driving of the CW laser light sources 51 and 52 as the operation state of the CW laser light sources 51 and 52.

Next, the operation will be described.

However, since the operation of the components other than the CW laser light sources 51 and 52 and the controller 53 are the same as those of the foregoing embodiment 1, only the operation of the CW laser light sources 51 and 52 and the controller 53 will be described.

For convenience of explanation, it is assumed here that as a normal operation state, the CW laser light source 51 oscillates the CW laser light with oscillation frequency $f_1$ and the CW laser light source 52 oscillates the CW laser light with frequency $f_2$.

However, it is assumed that frequencies $f_1$ and $f_2$ of the CW laser light oscillated by the CW laser light sources 51 and 52 are within the gain band of the optical fiber amplifier 6, and the difference between the frequency $f_1$ and the frequency $f_2$ is greater than the gain bandwidth of stimulated Brillouin scattering occurring in the optical fibers.

Accordingly, if the controller 53 controls the frequency of the CW laser light oscillated by the CW laser light source 51 at $f_1$, and the frequency of the CW laser light oscillated by the CW laser light source 52 at $f_2$, the present embodiment becomes the same configuration as the foregoing embodiment 1, offering the same advantages of the foregoing embodiment 1.

Accordingly, in this operation state, the laser light emitted from the transmit-receive optical system 8 to the atmosphere undergoes the Doppler shifts $f_{d1}$ and $f_{d2}$ which are given by Expressions (1) and (2) as described above, and the difference between the Doppler shift $f_{d1}$ and Doppler shift $f_{d2}$ is given by $(f_{d1}-f_{d2})=2V^*(f_1-f_2)/c$.

Therefore the difference $(f_{d1}-f_{d2})$ between the Doppler shifts is proportional to the difference $(f_1-f_2)$ between the frequencies of the CW laser light and the wind speed V.

The foregoing embodiment 1 describes that when the wind speed V is large, it can increase the overlap of the frequency components $f_{d1}$ and $f_{d2}$ by reducing the difference between the Doppler shift $f_{d1}$ and Doppler shift $f_{d2}$ by using the CW laser light sources 1 and 2 with a small difference between the frequency $f_1$ and frequency $f_2$, and can obtain the overlap of the frequency components of the received signal, thereby being able to increase the strength of the received signal.

However, there are some cases that the coherent Doppler lidar has to measure the spectral bandwidth of the received signal accurately. For example, this occurs when estimating the magnitude of the variation of the wind speed within the measuring range from the spread of the spectral bandwidth.

In such a case, in the configuration using the two CW laser light sources 1 and 2 with different wavelengths, the spectral bandwidth of the received signal spreads because the frequency components of the received signal for the individual wavelengths overlap each other as described above so that the measurement accuracy of the spectral bandwidth deteriorates.

In addition, since the overlap of the frequency components of the received signal varies depending on the wind speed V, a problem arises in that the spectral bandwidth fluctuates.

Considering this, the present embodiment 6 as shown in FIG. 6 is configured in such a manner that the controller 53 recognizes the spectral bandwidth of the received signal from the information about the target extracted by the signal processing unit 11, and controls the operation state of the CW laser light sources 51 and 52 in such a manner as to narrow the spectral bandwidth, thereby controlling the wavelengths of the CW laser light oscillated by the CW laser light sources 51 and 52.

For example, when the spectral bandwidth of the received signal is wider than a prescribed width, the controller 53 alters the frequency of the CW laser light oscillated by the CW laser light source 51 from $f_1$ to $f_1'$ so as to increase the difference between the frequency of the CW laser light oscillated by the CW laser light source 51 and the frequency of the CW laser light oscillated by the CW laser light source 52, and to remove the overlap of the received signal based on the CW laser light source 51 and the received signal based on the CW laser light source 52. This makes it possible to estimate the spectral shapes of the received signals corresponding to the individual CW laser light rays separately.

In this case, since the spectral bandwidth due to the overlap of the received signals corresponding to the individual CW laser light rays does not have a spread, the present embodiment 6 can prevent the deterioration of the measurement accuracy of the spectral bandwidth of the received signals corresponding to the individual CW laser light rays. In addition, the present embodiment 6 can further improve the measurement accuracy by estimating the spectral bandwidth of the received signals corresponding to the individual CW laser light rays separately, and by averaging or integrating the data.

In addition, if the control of the oscillation frequency of only one CW laser light source (CW laser light source 51, for example) cannot prevent the overlap of the received signal, it is also possible to control the oscillation frequencies of the CW laser light source 51 and CW laser light source 52 simultaneously. Alternatively, it is also possible to stop the operation of one of the CW laser light sources.

Stopping one of the CW laser light sources can give the same measurement accuracy of the spectral bandwidth as that of the normal coherent Doppler lidar using one CW laser light source.

Incidentally, as for the amount of changes in the oscillation frequencies of the CW laser light sources 51 and 52 and as for the operation state such as the stop of the CW laser light sources 51 and 52, the signal processing unit 11 can make a decision by estimating the spectral shape of the received signal.

In addition, to increase the measurement distance, since the configuration of FIG. 6 can, in the same manner as the foregoing embodiment 1, increase the overlap of the frequency components of the received signal for the individual CW laser light sources by reducing the difference between the oscillation frequencies of the two CW laser light sources 51 and 52 as small as possible within the gain bandwidth of stimulated Brillouin scattering, it can increase the measurement distance by increasing the strength of the received signal.

In addition, when the wind speed is large, since the present embodiment can adjust the difference between the oscillation frequencies of the CW laser light sources 51 and 52, it can increase the overlap of the frequency components of the received signal, thereby being able to increase the strength of the received signal.

As is clear from the foregoing description, according to the present embodiment 6, it is configured in such a manner that the controller 53 controls the wavelengths of the CW laser light oscillated by the CW laser light sources 51 and 52 in accordance with the information about the target extracted by the signal processing unit 11. Accordingly it offers an advantage of being able to increase the strength of the received signal and to improve the measurement accuracy.

Although the present embodiment 6 shows an example that comprises the controller 53 in the lidar having the two CW laser light sources so as to control the wavelengths of the CW laser light oscillated by the CW laser light sources 51 and 52, a configuration is also possible which comprises the controller 53 in the lidar having n CW laser light sources as shown in FIG. 2 so as to control the wavelengths of the CW laser light oscillated by the n CW laser light sources.

Alternatively, a configuration is also possible which comprises the controller 53 in the lidar having the spatial optical amplifier 41 and the transmit-receive light separator 42 as shown in FIG. 5 so as to control the oscillation wavelengths of the CW laser light sources incorporated into the lidar.

Incidentally, it is to be understood that a free combination of the individual embodiments, variations of any components of the individual embodiments or removal of any components of the individual embodiments are possible within the scope of the present invention.

INDUSTRIAL APPLICABILITY

A lidar in accordance with the present invention is suitable for an apparatus that must implement high SN ratio measurement when measuring the position or velocity of a target.

DESCRIPTION OF REFERENCE SYMBOLS

1, 2, 20, 30 CW laser light source;
3, 3₁-3_{n-1} optical multiplexing coupler (first optical multiplexer);
4 optical branching coupler (optical branching unit);
5 light modulator;
6 optical fiber amplifier;
7 optical circulator;
8 transmit-receive optical system;
9 optical multiplexing coupler (second optical multiplexer);
10 photodetector;
11 signal processing unit (information extractor);
21, 22 optical branching coupler (optical branching unit);
23, 24 light modulator;
25 optical multiplexing coupler (first optical multiplexer);
26 optical multiplexing coupler (second optical multiplexer);
27 optical multiplexing coupler (third optical multiplexer);
41 spatial optical amplifier (laser light amplifier);
42 transmit-receive light separator;
43 transmit-receive optical system;
51, 52 CW laser light source;
53 controller.

What is claimed is:

1. A lidar comprising:
a CW laser light source that oscillates a plurality of CW laser light rays with different wavelengths;
an optical branching unit that splits the CW laser light oscillated by the CW laser light source;
a light modulator that modulates first CW laser light split by the optical branching unit;
an optical fiber amplifier that amplifies the laser light modulated by the light modulator;
a transmit-receive optical system that irradiates a target with the laser light amplified by the optical fiber amplifier, and that receives scattered light of the laser light by the target;
a first optical multiplexer that mixes the scattered light received by the transmit-receive optical system and second CW laser light split by the optical branching unit, and that outputs mixed light of the scattered light and the CW laser light;
a photodetector that receives the mixed light output from the first optical multiplexer, and that detects beat signals of the scattered light and the CW laser light;
an information extractor that extracts information about the target from the beat signals detected with the photodetector, wherein
propagation optical paths of light within the lidar are composed of an optical fiber, and the beat signals detected by the photodetector are superposition of spectral components of the beat signals derived from the plurality of CW laser light rays with different wavelengths.

2. The lidar according to claim 1, wherein
the CW laser light source consists of a plurality of CW laser light sources that oscillate CW laser light rays with wavelengths different from each other, and the lidar further comprises:
a second optical multiplexer that mixes the CW laser light rays oscillated by the plurality of CW laser light sources.

3. The lidar according to claim 1, further comprising:
a laser light amplifier that further amplifies the laser light amplified by the optical fiber amplifier; and
a transmit-receive light separator that passes the laser light amplified by the laser light amplifier to the transmit-receive optical system, and that causes the scattered light received by the transmit-receive optical system to propagate to the first optical multiplexer.

4. The lidar according to claim 3, wherein
the laser light amplifier is a spatial solid-state laser amplifier.

5. The lidar according to claim 3, wherein
the laser light amplifier is a solid-state laser amplifier with a planar waveguiding structure.

6. The lidar according to claim 1, wherein
wavelength difference between the plurality of CW laser light rays is greater than gain bandwidth of stimulated Brillouin scattering occurring in an optical fiber.

7. The lidar according to claim 6, wherein
the frequency difference between the plurality of CW laser light rays is not less than 100 MHz.

8. The lidar according to claim 1, further comprising:
a controller that controls the different wavelengths of each of the plurality of CW laser light rays based on the information about the target extracted by the information extractor.

9. The lidar according to claim 8, wherein
the CW laser light sources are composed of a semiconductor laser.

10. The lidar according to claim 1, wherein
the information about the target extracted by the information extractor includes a received signal strength of the scattered light, a round-trip time, and a Doppler frequency.

* * * * *